(12) United States Patent
Altonen et al.

(10) Patent No.: US 8,985,390 B2
(45) Date of Patent: Mar. 24, 2015

(54) UNIT DOSE DISPENSING APPARATUS

(75) Inventors: Gene Michael Altonen, West Chester, OH (US); Sean Donald Riggenbach, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 280 days.

(21) Appl. No.: 12/884,830

(22) Filed: Sep. 17, 2010

(65) Prior Publication Data

US 2011/0089191 A1    Apr. 21, 2011

Related U.S. Application Data

(60) Provisional application No. 61/243,617, filed on Sep. 18, 2009.

(51) Int. Cl.
*B65D 37/00* (2006.01)
*G01F 11/28* (2006.01)

(52) U.S. Cl.
CPC ............ *G01F 11/286* (2013.01); *G01F 11/288* (2013.01)
USPC ............... 222/1; 222/212; 222/445; 222/496; 222/447; 222/449; 222/453; 222/518

(58) Field of Classification Search
CPC ..... G01F 11/286; G01F 11/288; G01F 11/02; G01F 11/021; G01F 11/023; G01F 11/025; G01F 11/028; G01F 11/04; G01F 11/06; G01F 11/08; G01F 11/082; G01F 11/14; G01F 11/16; G01F 11/30; G01F 11/32
USPC .......... 222/96, 496, 206–215, 442, 445, 447, 222/448, 449, 453, 478–489, 511, 518, 1
See application file for complete search history.

(56) References Cited

U.S. PATENT DOCUMENTS

| | | | | | |
|---|---|---|---|---|---|
| 564,209 | A | * | 7/1896 | Meins | 222/445 |
| 645,706 | A | * | 3/1900 | Grant | 222/453 |
| 1,402,604 | A | * | 1/1922 | Herschel | 222/447 |
| 1,947,310 | A | * | 2/1934 | Sample et al. | 222/321.6 |
| 2,017,839 | A | * | 10/1935 | Berendt | 222/445 |
| 2,331,659 | A | * | 10/1943 | Cutone | 222/445 |
| 3,128,915 | A | * | 4/1964 | Matter | 222/156 |
| 3,134,514 | A | * | 5/1964 | Booth | 222/207 |
| 3,141,579 | A | * | 7/1964 | Medlock | 222/207 |
| 3,169,267 | A | * | 2/1965 | Luedtke | 401/206 |
| 3,203,026 | A | * | 8/1965 | Schwartzman | 401/206 |

(Continued)

FOREIGN PATENT DOCUMENTS

| JP | 51-68746 | 11/1974 |
|---|---|---|
| JP | 06-003813 Y | 9/1988 |

(Continued)

OTHER PUBLICATIONS

PCT International Search Report dated Nov. 17, 2011.

*Primary Examiner* — Patrick M Buechner
(74) *Attorney, Agent, or Firm* — Angela K. Haughey

(57) ABSTRACT

A composition dispensing apparatus which can deliver an repeatable and accurate unit dose of a composition including: a compressible container; a unit dose delivery system comprising an entry element, an exit element, side walls and a dosage chamber; a dispensing aperture; wherein the linear movement ratio of the exit element to the entry element is about 1 or less.

16 Claims, 10 Drawing Sheets

(56) References Cited

U.S. PATENT DOCUMENTS

| | | | | |
|---|---|---|---|---|
| 3,349,966 A * | 10/1967 | Schwartzman | | 222/80 |
| 3,506,162 A * | 4/1970 | Schwartzman | | 222/207 |
| 3,540,636 A * | 11/1970 | Dvoracek | | 222/501 |
| 3,601,287 A * | 8/1971 | Schwartzman | | 222/146.2 |
| 3,658,216 A * | 4/1972 | Schwartzman | | 222/453 |
| 3,743,146 A * | 7/1973 | Schindler | | 222/446 |
| 4,053,089 A * | 10/1977 | Gamadia | | 222/207 |
| 4,684,046 A * | 8/1987 | Foster et al. | | 222/451 |
| 4,941,598 A * | 7/1990 | Lambelet et al. | | 222/321.6 |
| 4,979,653 A * | 12/1990 | Mon | | 222/453 |
| 5,033,654 A * | 7/1991 | Bennett | | 222/190 |
| 5,058,778 A * | 10/1991 | Weinstein | | 222/209 |
| 5,090,600 A * | 2/1992 | Clark | | 222/492 |
| 5,186,367 A * | 2/1993 | Hickerson | | 222/207 |
| 5,238,153 A * | 8/1993 | Castillo et al. | | 222/189.09 |
| 5,377,877 A * | 1/1995 | Brown et al. | | 222/105 |
| 5,947,335 A * | 9/1999 | Milio et al. | | 222/136 |
| 6,241,129 B1 * | 6/2001 | Bonningue et al. | | 222/213 |
| 6,415,961 B2 * | 7/2002 | Bonningue | | 222/249 |
| 6,484,906 B2 * | 11/2002 | Bonningue | | 222/207 |
| 6,974,053 B2 * | 12/2005 | Lautre et al. | | 222/92 |
| 7,104,426 B2 * | 9/2006 | Suzuki | | 222/209 |
| 8,136,701 B2 * | 3/2012 | Veltrop et al. | | 222/207 |
| 2002/0017536 A1 | 2/2002 | Bonningue | | |
| 2005/0257800 A1 | 11/2005 | Inoue | | |
| 2006/0216105 A1 | 9/2006 | Byun | | |
| 2006/0237483 A1 * | 10/2006 | Ophardt | | 222/207 |
| 2007/0131719 A1 * | 6/2007 | Masuda | | 222/256 |
| 2014/0231462 A1 * | 8/2014 | Ray et al. | | 222/207 |

FOREIGN PATENT DOCUMENTS

| | | |
|---|---|---|
| JP | 02-111642 U | 9/1990 |
| JP | 06-030693 Y | 9/1990 |
| JP | 10-072051 | 3/1998 |
| WO | 92/10727 A1 | 6/1992 |
| WO | 95/28620 A1 | 10/1995 |

* cited by examiner

UNIT DOSE DISPENSING APPARATUS

CROSS REFERENCE TO RELATED APPLICATION

This application claims the benefit of U.S. Provisional Application Ser. No. 61/243,617 filed Sep. 18, 2009.

FIELD OF THE INVENTION

The present invention relates to a dispensing apparatus which delivers a unit dose of a composition from a compressible container.

BACKGROUND OF THE INVENTION

Consumer compositions have been delivered from containers via pressure for many years. Traditional dispensing apparatuses, including pumps, tubes, and bottles deliver the compositions to the consumer using pressure. However, the dosage delivered to the consumer can vary widely based upon both the amount and duration of the pressure that the consumer applies to the container. Even dispensing apparatuses that do deliver a particular dose of composition traditionally i) deliver the dose with a pump which has many parts; ii) dispense into an area (such as a cup) which then drains any composition which exceeds the dose back into the container or, iii) are dispensed from a container which is held in a particular arrangement to allow gravity to assist with the delivery. The present invention relates to a dispensing apparatus which delivers an accurate and repeatable unit dose of a composition from a storage container utilizing force. The force applied can be manual force by a consumer applying hand pressure to the container. In one embodiment the container can be used in a variety of directions and delivers an accurate dose of composition regardless of the amount or duration of the pressure, and/or the rheological properties of the composition being dispensed. Furthermore, the delivery device of the present invention can be designed to deliver a wide range of composition dosages by varying the sizes and shapes of the parts of the unit dose dispensing apparatus.

It is an object of the present invention to deliver a unit dose of composition via pressure, wherein the delivery device is not limited by the rheology of the composition, the size of the dose, orientation of use, or the amount of pressure applied. This unit dose delivery system can be simply produced/manufactured and utilizes few components thereby minimizing the complexity of traditional delivery systems such as pumps.

SUMMARY OF THE INVENTION

A composition dispensing apparatus of the present invention comprising: a compressible container; a unit dose delivery system comprising an entry element, an exit element, side walls and a dosage chamber; a dispensing aperture; wherein the linear movement ratio of the exit element to the entry element is about 1 or less.

A method of delivering a unit dose of a composition using a composition dispensing apparatus of the present invention comprising: squeezing a compressible container containing a flowable composition; filling a dosage chamber with the flowable composition, wherein the dosage chamber comprises an entry element and an exit element and side walls; and wherein the entry element and the exit element are in mechanical connection with each other; and further wherein the entry element and the exit element form seals by engaging the side walls; moving the entry element and the exit element with the flowable composition; disengaging the seal of the exit element from the side walls at the same time or after engaging the seal of the entry element from the side walls; and dispensing the flowable composition through a dispensing aperture.

DETAILED DESCRIPTION OF THE INVENTION

Definitions

Figure 1:
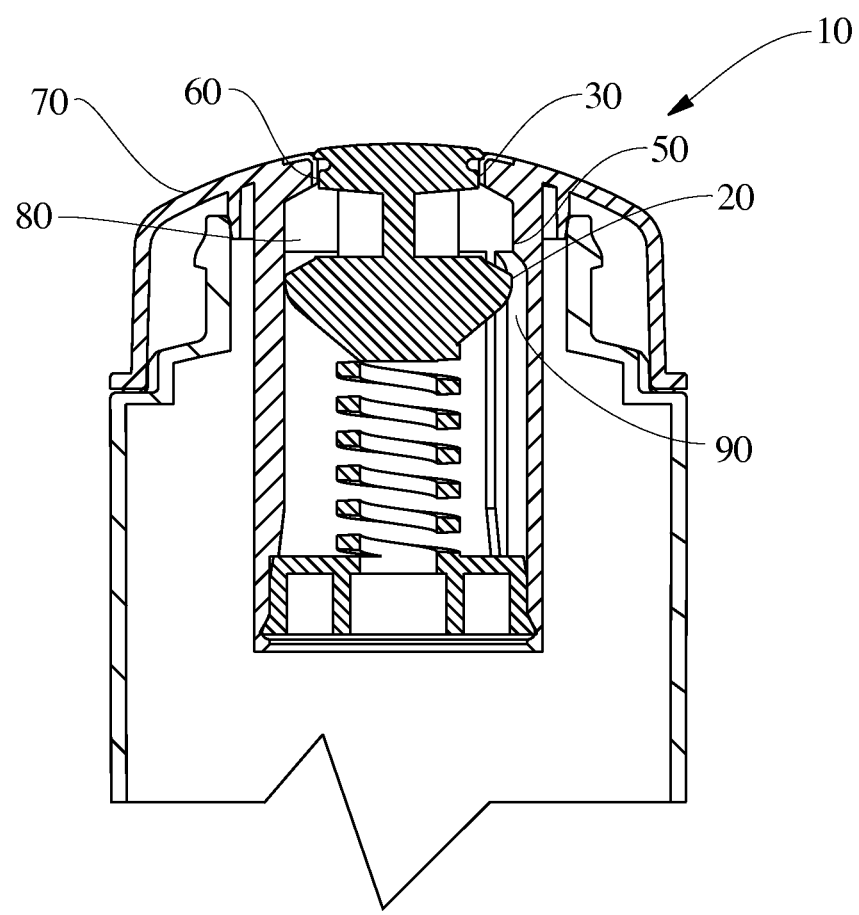
FIG. 1 is a cross-sectional view of the unit dose delivery system.

As used herein "Unit dose delivery system" is the portion of the composition dispensing apparatus that measures out the dose of composition and delivers the composition to the consumer; comprising the entry and exit elements, the side walls, and the dispensing surface.

As used herein "Entry Element" is the portion of the unit dose delivery system that the composition flows past and enters into the dosage chamber. The entry element can also provide a portion of the dosage chamber.

As used herein "Entry Aperture" is a space and/or aperture which exists between the entry element and the side walls through which the composition can flow, prior to a seal forming between the entry element and the side walls.

As used herein "Exit Element" is the portion of the unit dose delivery system that the composition flows towards in the dosage chamber. The exit element provides the portion of the dosage chamber that is immediately prior to the dispensing aperture of the unit dose delivery system. The entry and exit elements can be mechanically connected together. The exit element defines a portion of the dosage chamber.

As used herein "Seal" means a seal area between the edges of the entry or exit element and the corresponding side walls, and this seal area is sufficient to enable the composition contained within the composition dispensing apparatus to move the exit element to the location where the entry element engages the side walls. The seal between the exit element and side walls needs to be sized and shaped such that this seal disengages prior to the disengagement of the seal between the entry element and side walls. A seal, as used herein, is a seal sufficient to prevent composition leakage through the system.

As used herein "Mechanical Connection" means a structural connection.

As used herein "Dosage Chamber" means a chamber comprised of an entry and exit element and side walls, within which a desired dose of composition flows and then dispensed through a dispensing aperture. The dosage chamber creates a space into which the composition flows and from which the composition is dispensed through the dispensing aperture.

As used herein "Dispensing Aperture" means a space and/or hole that forms when the exit element disengages from the seal with the side walls. The composition can then flow through the dispensing aperture to dispense to the consumer.

As used herein "Dispensing Surface" means a surface on the composition dispensing apparatus from which the composition can be dispensed. The composition may flow through the dispensing aperture onto a dispensing surface.

As used herein "Compressible Container" means a container which decreases in volume as pressure is applied to the surfaces. In one embodiment pressure is applied to the outside surface of the compressible container. The compressible container can be any container which can be deformed by pressure, such as a bottle, tube, sachet, pouch etc. Additionally, the compressible container can apply pressure to a secondary container. The compressible container can be recoverable (i.e. return to its original shape) partially recoverable (only partially returns to its original shape), and/or collapsible. The pressure applied to the compressible container can be manual and/or can be applied by other force.

As used herein "Flowable composition" means a composition which is sufficiently flowable to be dispensed from a composition dispensing apparatus. Gas and/or air can be combined with the composition.

As used herein "Dispensing Element" means an element including, but not limited to, a porous material, a non-porous material, a foam pad, a cup, a brush, a comb, one or more protuberances, and/or any combination thereof. The composition may dispense through the dispensing aperture into and/or onto a dispensing element.

As used herein "Headspace" a volume or area in a compressible container which does not contain composition. This volume or area traditionally contains air or gases.

As used herein "Side walls" means surfaces against which the entry and exit elements seal. The side walls also can be a guide for the axial movement of the entry and exit elements during the dispensing process. The side walls form a part of the seal as the elements form the seal by contacting the side walls. The entry element seals with side walls and the exit element seals with side walls. The side walls can be the same, or there can be independent sets of side walls.

As used herein "Dip tube" means a tube, pipe or hose which has one end placed at the unit dose delivery system and the other end is in the container. The dip tube can facilitate flow of the composition from the container into the dose chamber of the unit dose delivery system. The diptube can comprise a flow valve which prohibits composition from flowing back down and/or into the tube into the container. The dip tube can be a separate or integral (injection molded) part of the dispenser or container.

As used herein "Spring" means a force generating device which can help return the entry and exit elements back to original resting (i.e. storage) positions, which is a seal between the exit element and the side walls. Also, the spring can facilitate transfer of composition from the compressible container into the entry element aperture.

As used herein "Plastic" means any polymeric material that is capable of being shaped or molded, with or without the application of heat. Usually plastics are a homo-polymer or co-polymer of high molecular weight. Plastics fitting this definition include, but are not limited to, polyolefins, polyesters, polyamides, vinyl, polyvinylchloride, acrylic, polycarbonates, polystyrene, and polyurethane. Plastics can include both thermoplastic and/or thermoset. Plastics can also include bio-polyethylene (i.e. renewable HDPE or LLDPE, such as that derived from fermentation of cane sugar to ethanol, dehydration of ethanol to ethylene, and polymerization of the bio-ethylene to bio-PE), bio-polypropylene (from bio-derived propanols via fermentation, dehydration, polymerization), bio-PET (either partially bio-derived: e.g. fermentation of sugar to ethanol, dehydration to ethylene, oxidation to bio-ethylene oxide, hydrolysis to bio-ethylene glycol monomer component of AB polymer or completely bio-derived: terephthalic acid component of AB polymer from fermentation of sugar to iso-butanol, dehydration to iso-butene, dimerization and aromatization to para-xylene, oxidation to bio-terephthalic acid), polylactic acid, including PLA blends with thermoplastic starch, polyhydroxyalkanoates and fillers. Also, blends of PLA with polyolefins, cellulose acetate, biodegradable thermoplastic starch materials, blends of thermoplastic starch with HDPE or PP or LLDPE or LDPE, polyhydroxyalkanoates, PET produced by the Integrex process (IntegRex technology is the integrated conversion of paraxylene (PX) to polyethylene terephthalate (PET) resin) to have lower footprint, poly(trimethylene terephthalate) (Sorona), Nylon 11 made from castor oil-derived monomer, and/or recycled as well as virgin versions of the all the materials mentioned. All materials can be filled with natural fillers such as grass, waste paper, kenaf, cellulose based fibers from a variety of sources. Additionally, all materials can be filled with inorganic materials such as calcium carbonate, clays and nanoclays.

As used herein "Bi-injection molding" is a part molding process that brings two or more material flows together into an integral part. Examples processes for bi-injection include, but are not limited to, use of co-injection, 2-gate or multiple gate stage injection, and overmoulding etc.

Composition Dispensing Apparatus

Figure 2:
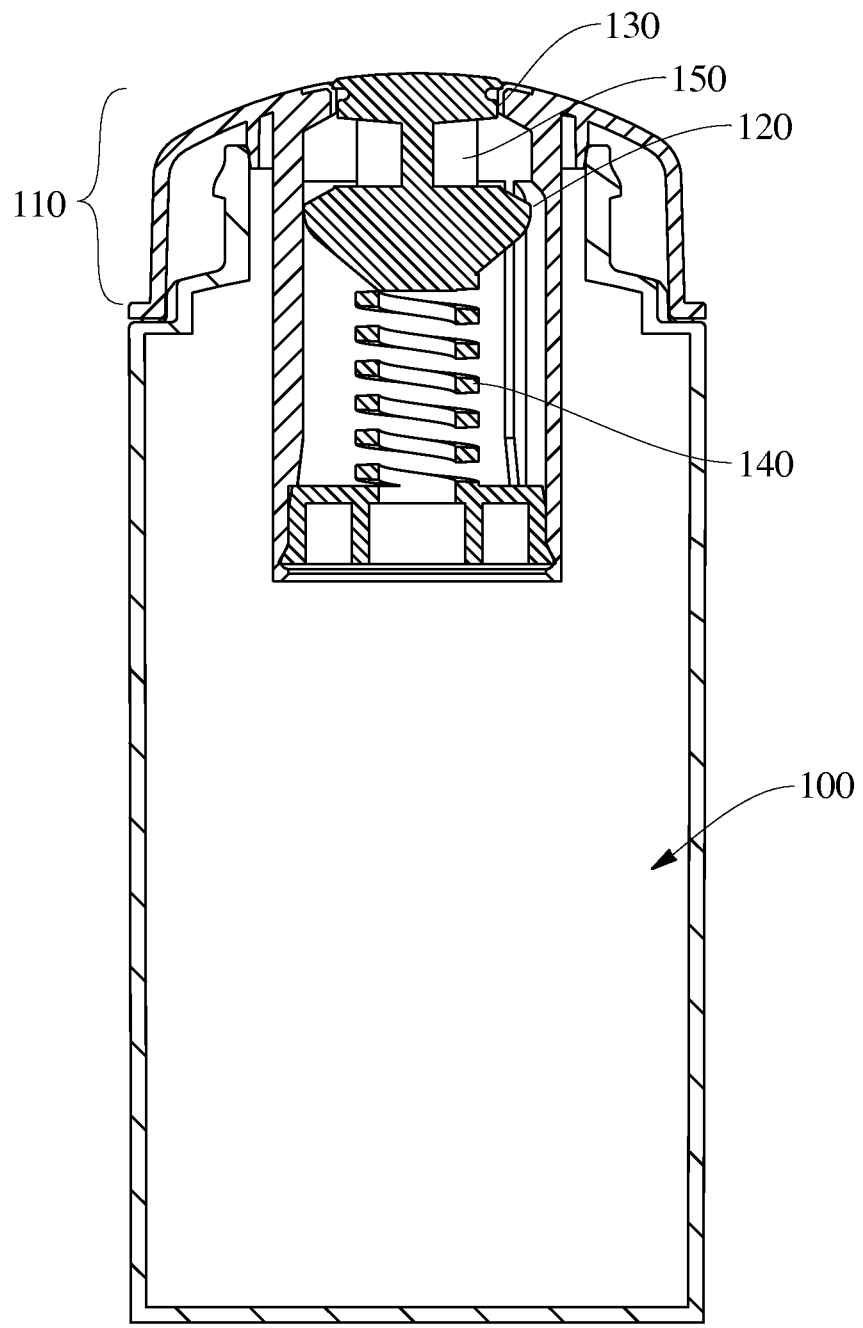
FIG. 2 is a cross-sectional view of the composition dispensing apparatus.
Figure 3:
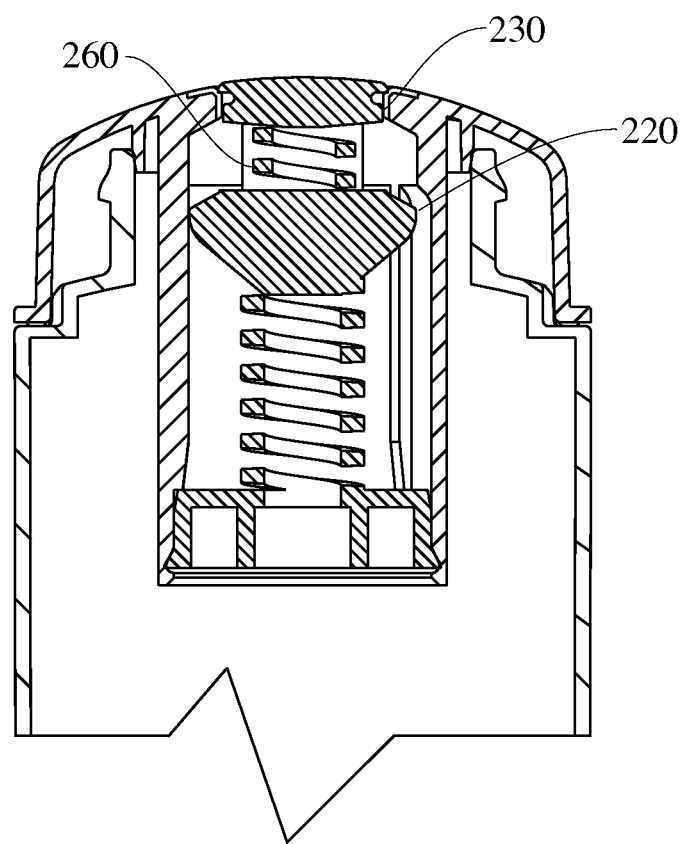
FIG. 3 is a cross-sectional view of the unit dose delivery system showing the mechanical connector as a spring and the entry and exit element effectively sealed with the sidewalls.

The composition dispensing apparatus of the present invention comprises the unit dose delivery system as well as the compressible container. A flowable composition is contained within and dispensed from the composition dispensing apparatus. FIG. 1 is one embodiment of the present inventive composition dispensing apparatus comprising a unit dose delivery system 10. A unit dose delivery system is shown in FIG. 1 comprising an entry element 20, and an exit element 30, side walls 50 and 60, and a dispensing surface 70. The unit dose delivery system illustrated in FIG. 1 is in the position to allow flow of the composition into the dosage chamber 80 through the entry aperture 90. This position is also the resting and/or storage position. This is the position the unit dose delivery system remains in when the composition is not in the process of being dispensed. As shown in FIG. 1 the exit element 30 is effectively sealed with the side walls 60, and the entry element is not sealed with the side walls 50, allowing for composition to flow past the entry element 20 via the entry aperture 90. FIG. 2 illustrates a compressible container 100 and a unit dose delivery system 110. A Mechanical Connection 150, is shown between the Entry Element 120 and Exit Element 130. This embodiment of the unit dose delivery system shown in FIG. 2 further comprises a spring element 140. This spring element can return the entry element 120 and exit element 130 back to a resting position after the composition is dispensed from the unit dose delivery system. In another embodiment, shown in FIG. 3, the mechanical connection between the exit element 230 and the entry element 220 is a spring element 260.

Figure 4:
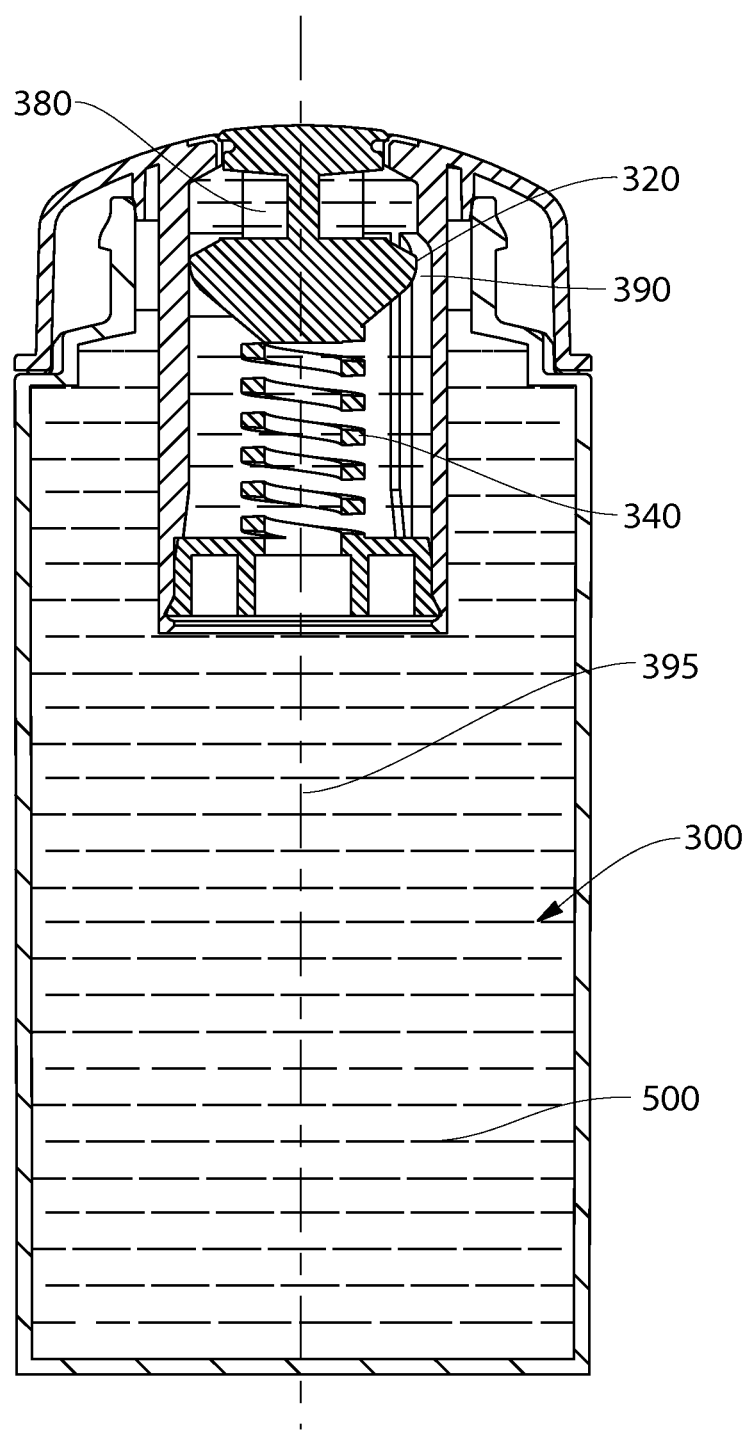
FIG. 4 is a cross-sectional view of the composition delivery system and shows the axial line of the composition delivery system.

FIG. 4 illustrates the axial line 395 of the composition dispensing apparatus. FIG. 4 further illustrates a spring element 340, and a compressible container 300.

Figure 5:
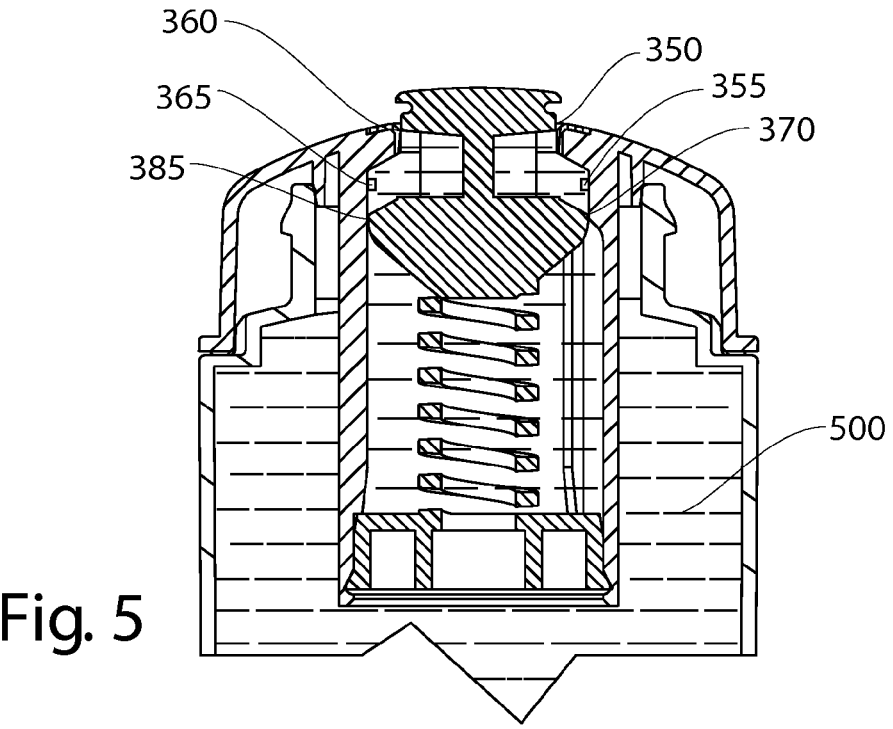
FIG. 5 is a cross-sectional view of the unit dose delivery system.

FIG. 5 illustrates the composition dispensing apparatus after the composition has flowed into the dosage chamber and both the entry and exit elements have formed seals with the side walls. FIG. 5 illustrates the seal of the exit element 350 and side walls 360, and the seal 370, 385 of the entry element and side walls.

Figure 6:
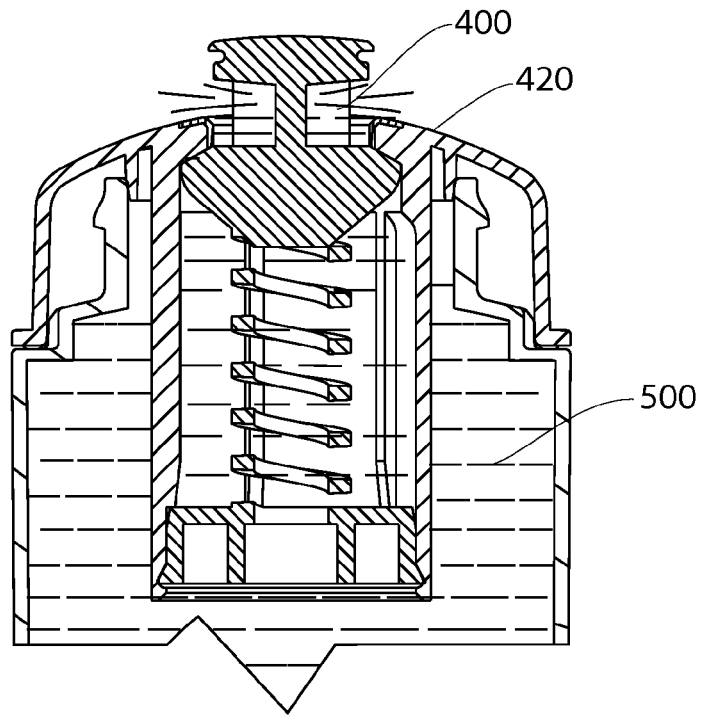
FIG. 6 is a cross-sectional view of the unit dose delivery system showing the dispensing aperture.

FIG. 6 illustrates the composition dispensing apparatus after the seal between the exit element and side walls has disengaged and the dispensing aperture 400 has formed to allow the composition to dispense from the aperture 400 onto the dispensing surface 420.

In one embodiment, the composition dispensing apparatus can dispense a composition to a consumer by the following method. (As illustrated in FIGS. 4-6.) The consumer first applies mechanical pressure to the compressible container 300 by manually squeezing the outside surfaces of the compressible container. The composition contained with the compressible container begins the transfer process. The composition flows past the entry element 320 via the entry aperture 390 into the dosage chamber 380. The composition continues to flow past the entry element until it reaches the exit element 330. The composition next begins to push the exit element along the axial line 395 of the composition dispensing apparatus, and the exit element begins to slide along the axial line towards the dispensing aperture of the unit dose delivery system. The pressure of the composition on the exit element moves both the exit element and mechanically connected entry element along the axial line of the composition dispensing apparatus until the entry element forms a seal 370 and 385 with the side walls. At this point in the dispensing process both the entry and exit elements are effectively sealed against the side walls and the dosage of the composition is established in the dosage chamber. The composition now pushes both the entry and exit element along the axial line by applying pressure to the entry element. The consumer continues to apply pressure until the exit element disengages from the side walls and the composition is dispensed through the dispensing aperture 400 onto the dispensing surface 420. Once the composition is dispensed the consumer releases the compressible container and the entry element and exit element return to resting position awaiting a new application of pressure by the consumer. The spring element, if present, can assist with returning the entry and exit element to the resting position, which is the entry element disengaged from the side walls (no seal) and exit element engaged with the side walls (having a seal). This position can prevent the composition from leaking out of the composition delivery system when the consumer is not dispensing the composition.

A seal is a seal sufficient to prevent composition leakage through the system.

In another embodiment air and/or gas is also included in the dosage chamber, and therefore air and/or gas may apply pressure to the exit element, thereby dispensing the contents of the dosage chamber which include air and/or gas as well as the composition through the dispensing aperture.

In another embodiment the full contents of the dosage chamber are not dispensed. In this embodiment about 98, 95, 90, 85, 80, 75, 70, 60, 50, 40, 30, 20 and/or 10% of the total contents of the dosage chamber are dispensed through the dispensing aperture. In one embodiment a blocking element, such as a protuberance 355, 365 (FIG. 5), exists along the side walls, located between the entry and exit elements, which prevent the entry element from pushing any additional composition from the dosage chamber through the dispensing aperture. In another embodiment a connection between the entry element and the compressible container prevents any further movement of the entry element, thereby preventing any additional composition from dispensing from the dosage chamber through the dispensing aperture. In yet another embodiment a spring is used to limit the movement of the entry element thereby limiting the amount of the composition which dispenses from the dosage chamber through the dispensing aperture.

The unit dose delivery system of the present invention can deliver the same dose of composition to the consumer regardless of the amount of pressure applied by the consumer, as the dose is established by unit dose delivery system structure rather than the amount of pressure applied by the consumer.

Figure 7:
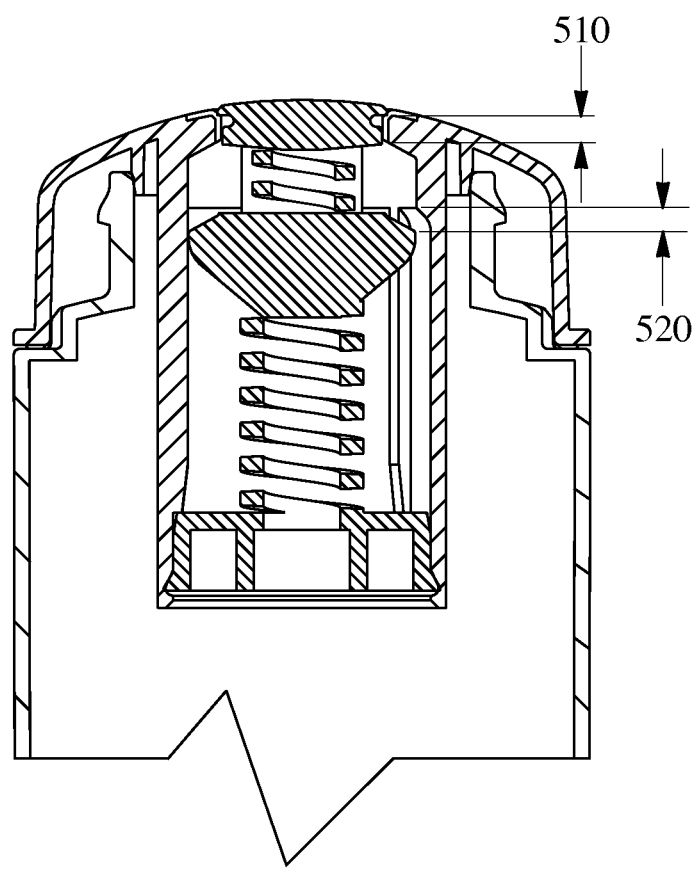
FIG. 7 is a cross-sectional view of the unit dose delivery system.

In one embodiment of the present invention the exit element and the entry element move along the axial line of the composition delivery system. The exit and entry elements move axially along the side walls at a linear movement ratio of about 1 or less; and in one embodiment the linear movement ratio is from about 1 to about 0. The linear movement ratio is the ratio of the movement of the Exit Element ($L_1$, shown in FIG. 7 at 510), divided by the movement of the Entry Element ($L_2$, shown in FIG. 7 at 520).

$$\text{Linear Movement Ratio} = L_1/L_2$$

It is understood that in certain embodiments that the linear movement ratio could be greater than one however, this arrangement may include additional elements and/or complexity to the design of the composition.

The composition dispensing apparatus of the present invention are designed to deliver flowable compositions such as creams, gels, soft solids, pastes, liquids, and/or any other flowable composition, including but not limited to flowable powders, granules and/or beads. In one embodiment the composition is a skin care composition, an antiperspirant and/or deodorant composition, a hair care composition, an oral care composition, and any combination thereof.

The composition dispensing apparatus of the present invention can be comprised of a single or a variety of materials including but not limited plastics and materials disclosed in U.S. Pat. Nos. 6,959,524, and 6,572,300 and U.S. Patent Application No. 2008/0003387. Additionally, the composition dispensing apparatus of the present invention can be injection molded, blow molded, bag formed and/or molded or formed in any other suitable means. Examples of methods of injection molding are included in U.S. Pat. Nos. 6,959,524, and 6,572,300. In one embodiment the dispensing apparatus of the present invention comprises thermoplastic elastomers. The term thermoplastic elastomers as used herein, includes but is not limited to, all suitable materials having a Shore A hardness ranging from Shore A 3 to Shore A 95 selected from the group including thermoplastic elastomers, thermoplastic vulcanizates, thermosetting or vulcanized elastomers, ethylene copolymers and terpolymers, closed or open cell polymeric foam, and mixtures or compounds thereof. Suitable thermoplastic elastomers include, but are not limited to, styrene-isoprene triblock copolymers such as Kraton D series from Shell; styrene-butadiene-styrene triblock copolymers such as the Kraton D series from Shell; styrene-saturated olefin-styrene triblock copolymers such as the Kraton G series from Shell; thermoplastic rubber compounds such as the Dynaflex series from GLS Corporation; ethylene propylene elastomers; polyester-polyether multiblock copolymers such as the Hytrel Series from DuPont; polyamide-polyether multiblock copolymers such s the Pebax series from Atochem; and polyurethance elastomers such as the Estane family from BF Goodrich. Suitable theremoplastic vulcanizates include, but are not limited to, Santoprene series from Advanced Elastomers. Suitable thermosetting or vulcanized elastomers include, but are not limited to, polyisoprene rubber; polybutadience; styrene butadiene; nitriale; chlorpene (=Neoprene=chloroisoprene); butyl and ethylene-propylene diene monomer (EPDM). Suitable ethylene copolymers include, but are not limited to, ethylene vinylacetate; ethylene methyl acrylate; ethylene ethyl acrylate; ethylene butane; ethylene hexane; ethylene octane; and ethylene propylene in which the mole % ethylene is <50%.

Figure 8:
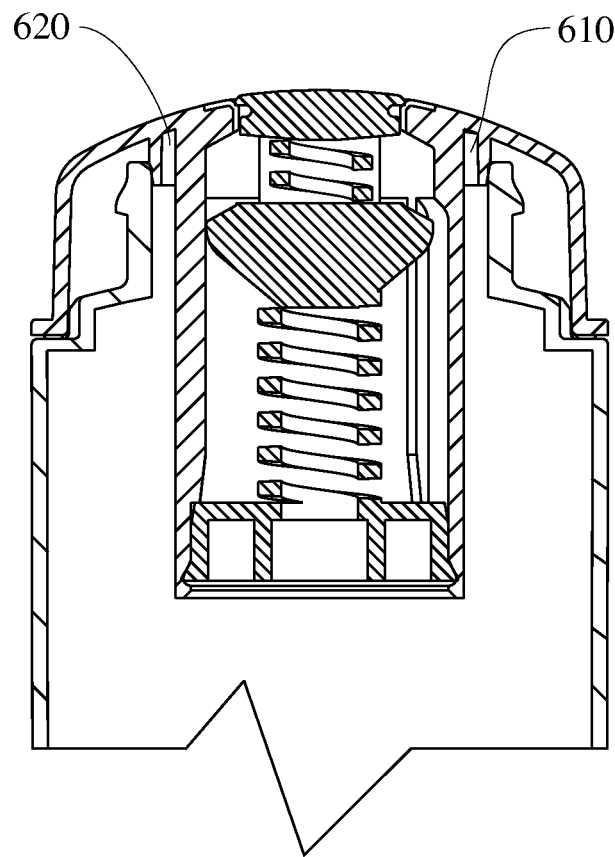
FIG. 8 is a cross-sectional view of the unit dose delivery system showing the air check valves.

In one embodiment the unit dose apparatus further comprises an air check valve, which helps maintain a desired amount of pressure (by adjusting the amount of air and/or gas) in the unit dose delivery system. (As shown in FIG. 8) The air check valve allows enough air and/or gas out of the unit dose delivery system to allow product to leave, and allows enough air and/or gas back into the unit dose delivery system to replace the amount of product that is dispensed. In one embodiment the air check valve maintains a certain amount of pressure in the headspace that exists in the unit dose delivery system.

The air check valve 610 and 620 can prevent the container comprising the composition from collapsing, and/or paneling. The air check valve can comprise a thermoplastic elastomer that is formed along the upper and outer surfaces of the unit dose delivery system. The air check valve can be integrally formed into the unit dose delivery system by bi-injection molding, blow molding, bag forming and/or molded or formed in any other suitable means. Also, in one embodiment of the air check valve, a valve opening can be formed on the upper surface between the resilient and/or rigid surface and is biased into a normally closed configuration. An air channel axially disposed within the air check valve system and in communication with the valve opening, allows air to force the resilient valves to an open configuration (upon release of the container walls) when the air pressure differential (container walls) is greater than the bias force of the resilient surfaces, the thermoplastic elastomer flaps. One suitable example of this is disclosed in U.S. Patent Application No 2008/0087623.

This air check valve could be used in combination with any number of containers to adjust the amount of pressure existing in the container. For example, this air check valve could be used with a traditional pump and/or bottle to maintain the desired pressure in the dispensing system. The air check valve can be integrally formed into the dispensing system by bi-injection molding, blow molding, bag forming and/or molded or formed in any other suitable means.

As a consumer squeezes the compressible container, pressure is generated through the headspace which in turn starts the transfer of the flowable composition through the unit dose delivery system. As the flowable composition begins transitioning up through the delivery system, the thermoplastic elastomer that is bi-injected into the dome surface (the air check valve) helps seal the entire system so that the flowable composition can only exit via one path, the dispensing aperture. As the entry and exit elements move along the axial line of the unit dose delivery system, the compressible container is still a closed system. Once the compressible container is released, the entry and exit elements begin to transition back to the original and/or resting position and the air check valve which can have one or more, and in one embodiment two flaps, and is a tight fit between the internal diameter of the unit dose delivery system and the external diameter of the dispensing aperture while the composition is dispensing, begins to flex open and allows for atmospheric air to flow into the headspace of the container.

Figure 9:
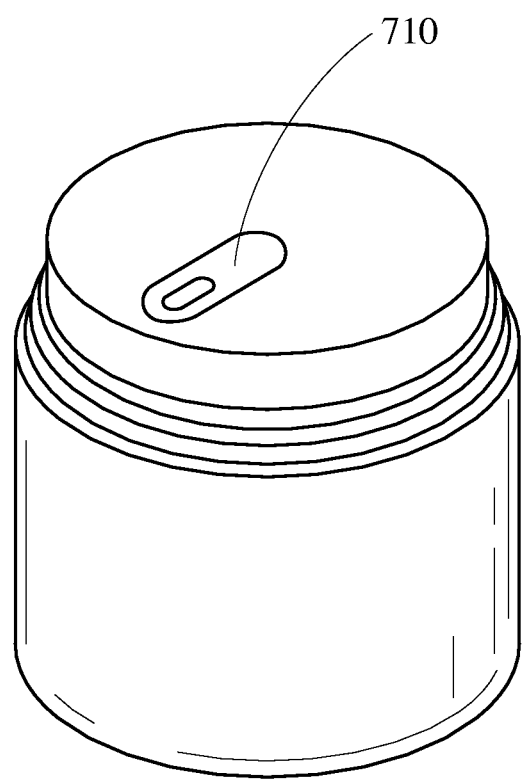
FIG. 9 is a top view of the composition dispensing apparatus showing the dispensing surface.

The composition can dispense through the dispensing aperture to a variety of dispensing surfaces and/or dispensing elements. The dispensing surface can be a concave or convex dome. In another embodiment the dispensing aperture dispenses onto an element including, but not limited to, a porous material, a non-porous material, a foam pad, a cup, a brush, a comb, one or more protuberances, and/or any combination thereof. In another embodiment the dispensing surface is a shaped surface which enhances application of the composition when it is dispensed from the dispensing surface. For example, the dispensing surface can be shaped to enhance application to the underarm (as shown in FIG. 1 at 70). In another embodiment, the surface is concave and shaped to allow a consumer to wipe the surface with the finger and/or substrate, and then apply the composition manually to the desired surface (as shown in FIG. 9 at 710).

Figure 11:
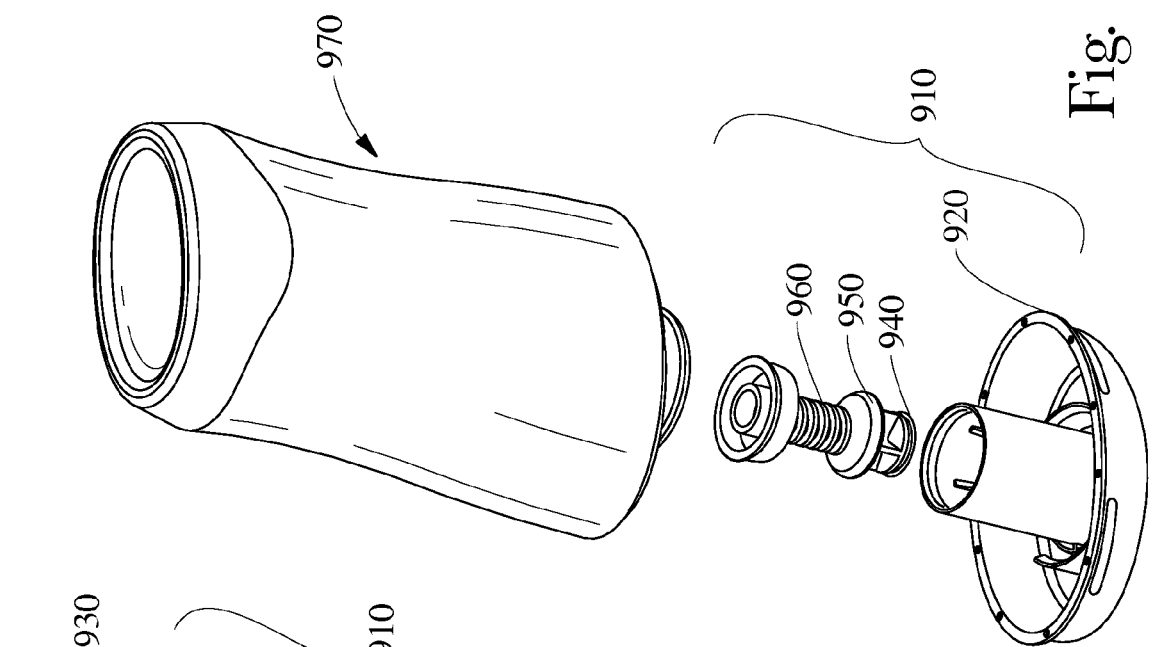
FIGS. 10 and 11 are perspective views of the composition delivery apparatus.
Figure 10:
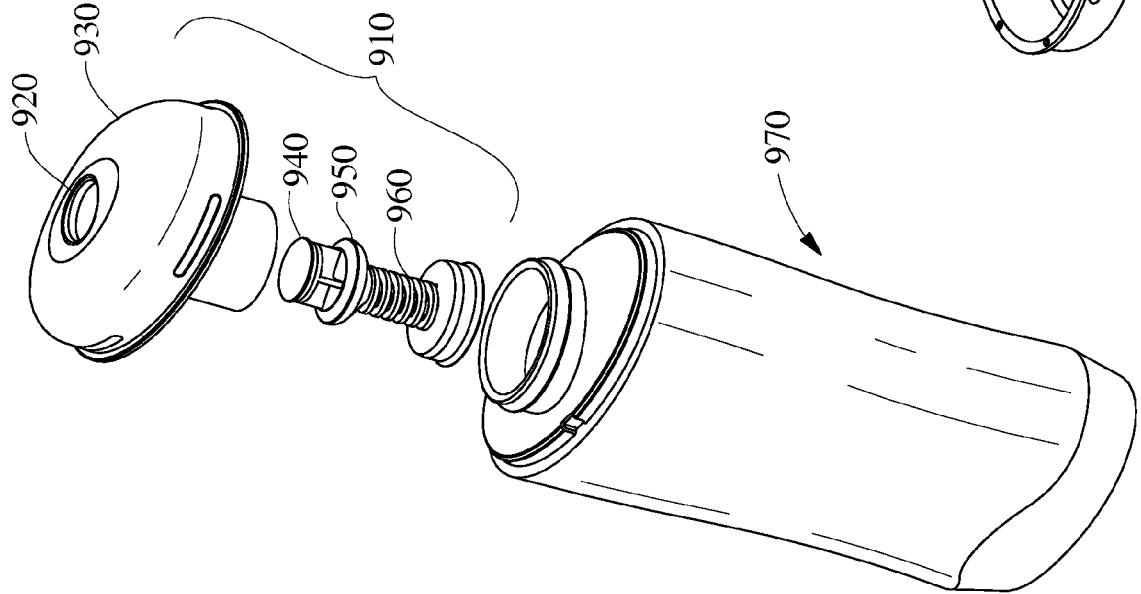

In one particular embodiment the unit dose delivery system 910 is attached to a compressible container 970 (as shown in FIGS. 10-11). The unit dose delivery system comprises the dispensing aperture 920, the dispensing surface 930, the exit element 940, the entry element 950, and the spring element 960. This particular embodiment can be useful for dispensing and application of a composition to the underarm.

The composition dispensing apparatus of the present invention can be used in any direction, and is not dependent on the action of gravity.

Figure 12:
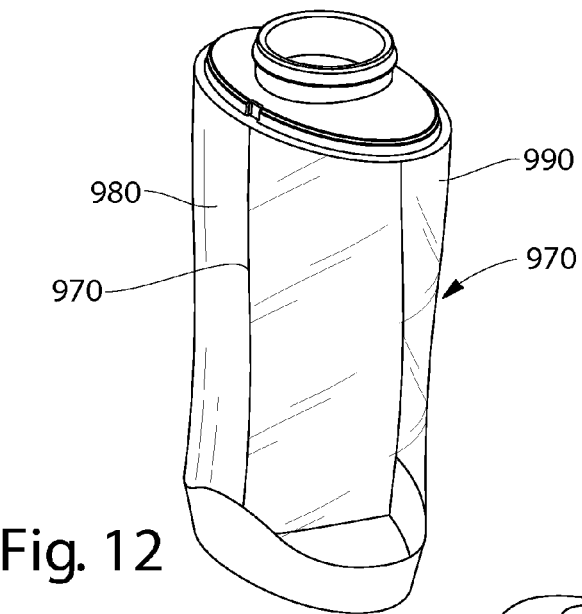
FIG. 12 is a compressible container having dual chambers.
Figure 13:
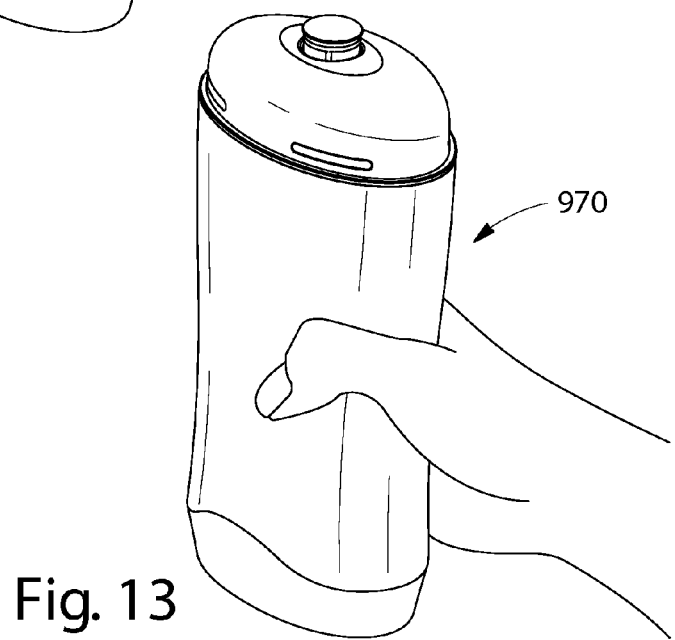
FIG. 13 is a perspective view of a compressible container.

Additionally, the composition dispensing apparatus of the present invention can comprise a multi-chambered compressible container. For example the compressible container can have a wall 970 which divides the container into two chambers 980 and 990 (FIG. 12).

Additionally, the composition dispensing apparatus of the present invention can further comprise a dial and/or other mechanism which can change the shape and/or size of either the dosage chamber and/or the distance the entry and/or exit element can move axially in order to change the dose of composition dispensed to the consumer. In one embodiment the composition dispensing apparatus has buttons along the side that can add or remove protuberances which either allow the entry and/or exit elements to move more or less along the axial line of the composition dispensing apparatus. Limiting and/or increasing the movement of the entry and/or exit element can limit or increase the amount of composition which is dispensed from the composition dispensing apparatus. This would allow a consumer to decide how much or little of the composition they want to dispense. Additionally, this would allow for one composition dispensing apparatus to be manufactured, yet a variety of dosages being accurately dispensed to the consumer.

Test Method

Dose and Seal Test Method

This Dose and Seal Test Method captures the procedure used to evaluate a consistent unit dose and effective seal.

The test is run using a texture analyzer TA.XTplus manufactured by Stable Micro Systems Surrey, UK and comprises a linear motor with a force probe and a gauge.

Obtain 10 compressible containers and 10 unit dose delivery systems. Using mineral oil (white mineral oil manufactured by Sunneborn Inc. Petrolia, US), fill the compressible containers at 50% volume. Assemble a unit dose delivery system to the compressible containers to form a dispensing apparatus. Using the texture analyzer, set up test parameters:

Pre-test speed: 1 mm/sec
Test speed: 6 mm/sec
Post-test speed: 12 mm/sec
Distance: 10 mm The balance is positioned below the testing system to effectively measure each dose from the dispensing apparatus.
12 individual doses are dispensed and measured for each of the dispensing apparatuses.
The Average and Standard Deviation are calculated.
The Total Average and Standard Deviation of all sets are then calculated.

EXAMPLES

A unit dose delivery system was made according to the present invention. The unit dose delivery system was tested according to the Dose and Seal Test Method described above.

| | Dose (g) | | | | | | | | | |
|---|---|---|---|---|---|---|---|---|---|---|
| Squeeze | A | B | C | D | E | F | G | H | I | J |
| 1 | 0.30 | 0.31 | 0.31 | 0.32 | 0.29 | 0.30 | 0.29 | 0.29 | 0.3 | 0.29 |
| 2 | 0.28 | 0.28 | 0.28 | 0.30 | 0.29 | 0.30 | 0.31 | 0.25 | 0.28 | 0.26 |
| 3 | 0.32 | 0.33 | 0.33 | 0.22 | 0.29 | 0.28 | 0.29 | 0.34 | 0.32 | 0.32 |
| 4 | 0.28 | 0.28 | 0.28 | 0.31 | 0.27 | 0.28 | 0.29 | 0.28 | 0.29 | 0.29 |
| 5 | 0.31 | 0.30 | 0.30 | 0.26 | 0.31 | 0.33 | 0.29 | 0.32 | 0.36 | 0.27 |
| 6 | 0.31 | 0.32 | 0.32 | 0.29 | 0.23 | 0.27 | 0.30 | 0.27 | 0.38 | 0.31 |
| 7 | 0.31 | 0.34 | 0.34 | 0.23 | 0.31 | 0.26 | 0.28 | 0.25 | 0.34 | 0.3 |
| 8 | 0.33 | 0.28 | 0.28 | 0.31 | 0.30 | 0.27 | 0.28 | 0.3 | 0.32 | 0.3 |
| 9 | 0.34 | 0.35 | 0.35 | 0.30 | 0.27 | 0.28 | 0.31 | 0.27 | 0.32 | 0.29 |
| 10 | 0.28 | 0.20 | 0.28 | 0.29 | 0.29 | 0.27 | 0.28 | 0.3 | 0.36 | 0.32 |
| 11 | 0.32 | 0.31 | 0.31 | 0.25 | 0.30 | 0.26 | 0.29 | 0.28 | 0.31 | 0.27 |
| 12 | 0.28 | 0.33 | 0.33 | 0.28 | 0.29 | 0.32 | 0.29 | 0.28 | 0.32 | 0.28 |
| Average Dose (g) | 0.3050 | 0.3025 | 0.3092 | 0.2800 | 0.2867 | 0.2850 | 0.2917 | 0.2858 | 0.3250 | 0.2917 |
| StDev | 0.0211 | 0.0400 | 0.0254 | 0.0328 | 0.0219 | 0.0228 | 0.0103 | 0.0264 | 0.0300 | 0.0195 |

| Test Parameters: | |
|---|---|
| Mineral oil product fill (%) | 50 |
| Pre-test speed (mm/sec) | 1 |
| Test speed (mm/sec) | 6 |
| Post-test speed (mm/sec) | 12 |
| Distance (mm) | 10 |

"The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A composition dispensing apparatus comprising:
   (a) a compressible container;
   (b) a unit dose delivery system comprising an entry element, an exit element, side walls and a dosage chamber;
   (c) a dispensing aperture;
   wherein the linear movement ratio of the exit element to the entry element is less than 1, wherein the unit dose delivery system comprises at least one protuberance on the side walls between the entry element and exit element, and wherein the at least one protuberance prevents the entry element from pushing additional composition from the dosage chamber through the dispensing aperture after a unit dose is delivered.

2. The apparatus of claim 1, wherein the apparatus further comprises a dispensing surface.

3. The apparatus of claim 2, wherein the dispensing surface is concave.

4. The apparatus of claim 2, wherein the dispensing surface is convex.

5. The apparatus of claim 1, wherein the apparatus further comprises a dispensing element.

6. The apparatus of claim 1, wherein the container further comprises a head space.

7. The apparatus of claim 6, wherein the apparatus further comprises at least one air check valve.

8. The apparatus of claim 7, wherein the air check valve is comprised of thermoplastic elastomer.

9. The apparatus of claim 1, wherein the unit dose delivery system further comprises a spring.

10. A method of delivering a unit dose of a composition comprising:
   (a) squeezing a compressible container containing a flowable composition;
   (b) filling a dosage chamber with the flowable composition, wherein the dosage chamber comprises an entry element and an exit element and side walls; and wherein the entry element and the exit element are in mechanical connection with each other; and further wherein the entry element and the exit element form seals by engaging the side walls; wherein the linear movement ratio of the exit element to the entry element is less than 1;
   (c) moving the entry element and the exit element with the flowable composition;
   (d) disengaging the seal of the exit element from the side walls at the same time or after engaging the seal of the entry element from the side walls; and
   (e) dispensing the flowable composition through a dispensing aperture;
   wherein the unit dose delivery system comprises at least one protuberance on the side walls between the entry element and exit element, and wherein the at least one protuberance prevents the entry element from pushing additional composition from the dosage chamber through the dispensing aperture after the unit dose is delivered.

11. The method of claim 10, wherein the movement of the exit element is limited.

12. The method of claim 10, wherein the composition further dispenses onto a dispensing surface.

13. The method of claim 12, wherein the composition is applied to the skin.

14. The method of claim 10, wherein the composition further dispenses onto a convex dispensing surface, and the consumer removes the composition from the convex dispensing surface with a finger.

15. The method of claim 10, further comprising returning the entry and exit elements to the original resting position.

16. The method of claim 15, wherein a spring element returns the entry and exit elements to the original resting position.

* * * * *